United States Patent [19]

Ness

[11] Patent Number: 4,505,105
[45] Date of Patent: Mar. 19, 1985

[54] NO-BACK GAS GENERATOR AND METHOD

[75] Inventor: Ronald J. Ness, Corona, Calif.

[73] Assignee: The Garrett Corporation, Los Angeles, Calif.

[21] Appl. No.: 524,049

[22] Filed: Aug. 17, 1983

[51] Int. Cl.³ .............................. F02K 9/42; F02K 9/94
[52] U.S. Cl. .................................. 60/200.1; 60/39.462; 422/179
[58] Field of Search .............. 60/39.02, 39.462, 200.1, 60/723; 422/177, 179, 219, 221

[56] References Cited

U.S. PATENT DOCUMENTS

| | | | |
|---|---|---|---|
| 3,094,394 | 6/1963 | Innes et al. | 60/299 |
| 3,598,543 | 8/1971 | Crosby et al. | 60/299 |
| 3,838,977 | 10/1974 | Warren | 422/179 |
| 3,899,303 | 8/1975 | Gaysert | 422/177 |
| 4,069,664 | 1/1978 | Ellion et al. | 60/200.1 |
| 4,352,782 | 10/1982 | Daly | 60/299 |

FOREIGN PATENT DOCUMENTS

| | | | |
|---|---|---|---|
| 2310843 | 3/1973 | Fed. Rep. of Germany | 422/177 |
| 2198536 | 3/1974 | France | 422/179 |

Primary Examiner—Carlton R. Croyle
Assistant Examiner—Timothy S. Thorpe
Attorney, Agent, or Firm—James W. McFarland; Albert J. Miller

[57] ABSTRACT

An emergency power unit with a gas generator having a locking means which compensates for compaction and degradation in the catalyst bed to reduce destructive oscillatory vibration in the gas generator, thereby substantially extending the life and assuring dependable performance of the gas generator.

17 Claims, 5 Drawing Figures

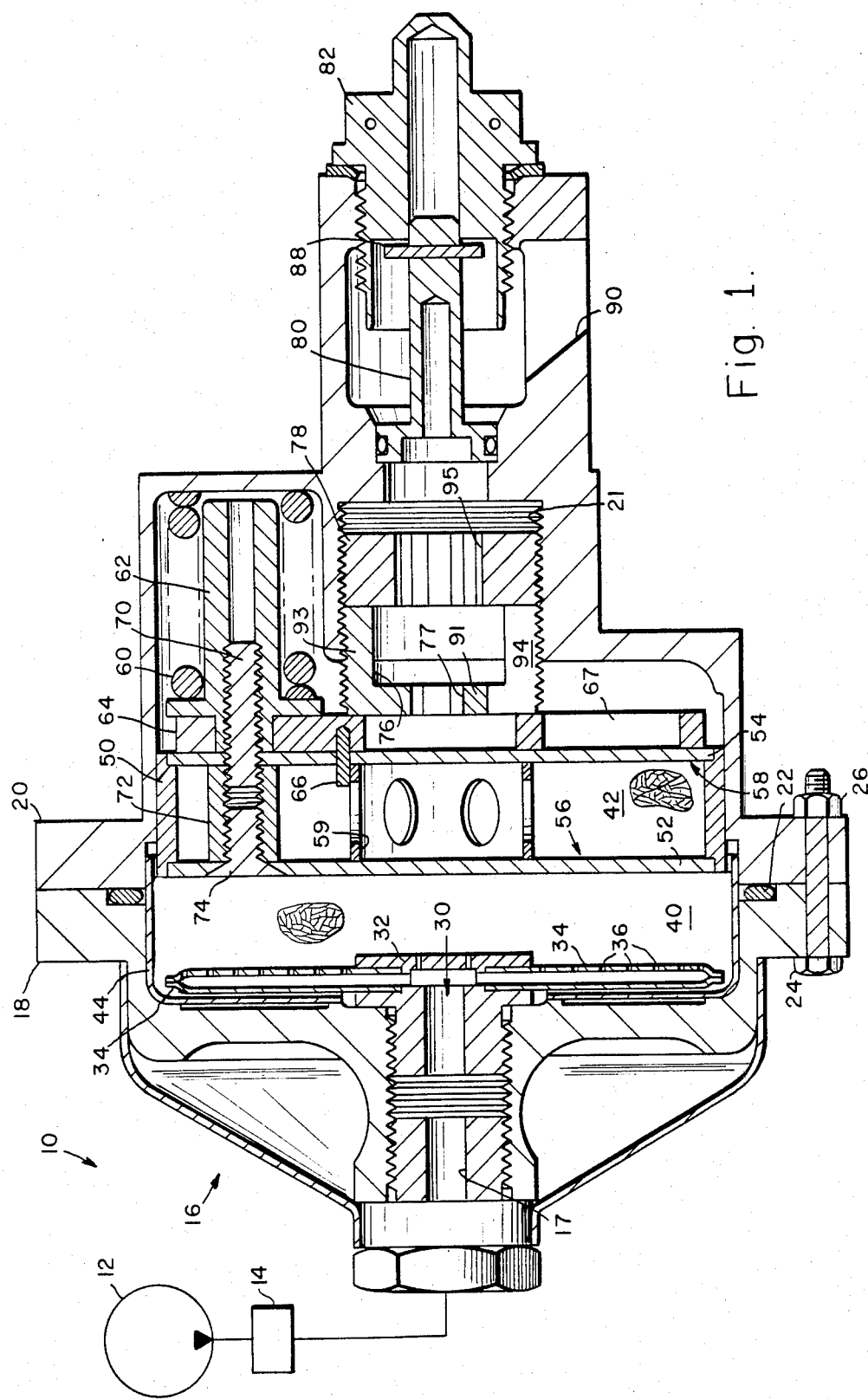

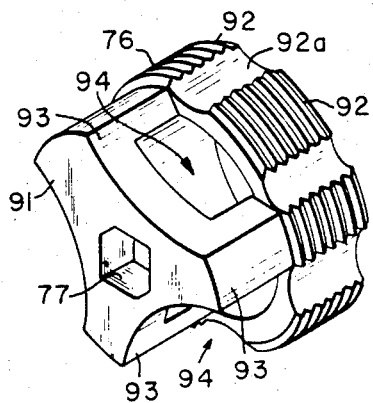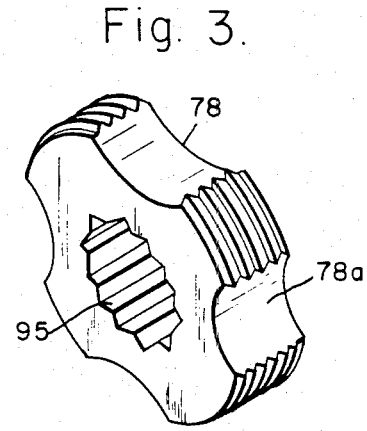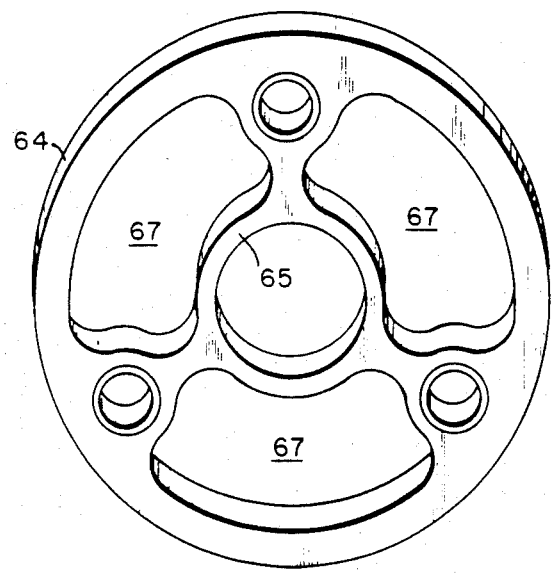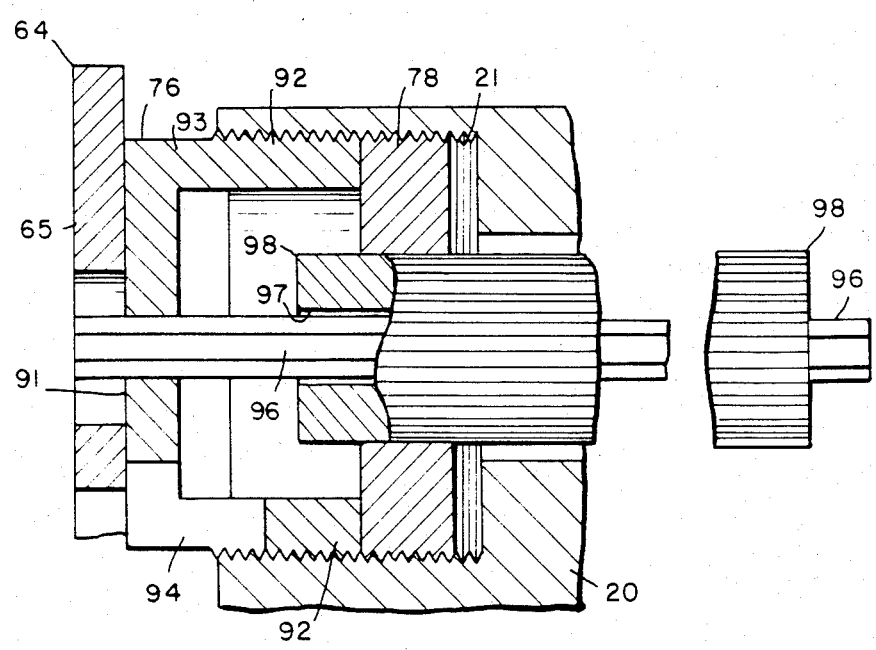

NO-BACK GAS GENERATOR AND METHOD

RELATED APPLICATIONS

This specification is one of a group of specifications dealing with gas generator technology, all of which are assigned to the present assignee, including: Gas Generator With Ratchet No-Back and Method, Ser. No. 524,047, by George Kasabian; and Emergency Power Unit and Method, Ser. No. 524,048, by Francis K. Weigand, et al., both of which were filed concurrently with this specification.

BACKGROUND OF THE INVENTION

Gas generators, particularly those having application as emergency power units for military aircraft, are small, lightweight, intermittent duty power supply devices which ensure instant, reliable power output even after relatively long dormant periods. Such gas generators typically utilize a pulsed spray of liquid hydrazine into a catalyst bed such as Shell 405, in which production of hot gas occurs. The gas generated by the device may then be used to drive a turbine wheel, which may power such devices as engine starters, electrical generators, and hydraulic pumps.

Gas generators for military applications are designed to be reusable, with only a minimal amount of maintenance being required between uses. It is therefore imperative that the gas generator be capable of a consistent and reliable level of performance involving repeated usage over an extended period of time without requiring major overall, rebuilding, or replacement of the catalyst.

In one arrangement, the catalyst in the gas generator is located in two distinct beds, a primary bed into which the liquid hydrazine is introduced by a spray nozzle device, and a secondary bed interposed between the primary bed and the location in the generator at which the gas generated exits the device. The liquid hydrazine initially decomposes into a gas in the first catalyst bed, and the characteristics of the gas exiting the device are shaped as the gas travels through the second catalyst bed, reaching a high temperature.

Liquid hydrazine is supplied to the gas generator at a pressure of approximately 300 p.s.i., and gas leaving the generator is at approximately the same pressure. The gas generator is therefore controlled by the amount of liquid hydrazine sprayed into the catalyst beds, which amount determines the volume of gas produced by the gas generator, and therefore controls the speed at which a turbine driven by the gas generator will operate.

In order to precisely control the operating speed of the turbine, liquid hydrazine is pulsed into the catalyst bed rather than supplied in a continuous flow. The speed of the turbine is controlled by varying the rate at which the liquid hydrazine is pulsed into the gas generator, increasing the pulse rate to increase the speed of the turbine, and decreasing the pulse rate to decrease the speed of the turbine. It will be recognized that since the system may operate a generator required to operate at a particular frequency, having precise control of the speed of the turbine, and the volume and other characteristics of the gas produced by the gas generator, is an important requirement.

While the technique of pulsing the liquid hydrazine into the gas generator is highly desirable due to the precise degree of control possible over the power output of the device, the pulsing operation has proven to be extremly destructive to the catalyst beds, drastically limiting the life of the gas generator. The hydrazine liquid pulsed into the gas generator causes an oscillatory movement in the catalyst beds resulting in destructive vibration of the catalyst, which is in the form of particles having a particular size and shape. The vibration in the catalyst beds causes the particles to be broken down into less useful, smaller particles, and finally into dust. The vibration problem is particularly destructive in the primary bed, which is situated immediately adjacent the spray nozzles through which the liquid hydrazine is introduced into the gas generator. As the catalyst particles in the primary bed break up, the dust produced migrates into the secondary bed, which becomes clogged rapidly by the dust, thus increasing the pressure drop across the gas generator. The vibration problem in the primary bed is so severe as to cause significant abrasion on the interior of the gas generator.

In order to minimize this problem, in the past biasing springs have been used to force the secondary catalyst bed, typically enclosed in a porous cylindrical structure, against the primary catalyst bed to compensate for compaction, bed degradation in the primary bed, and/or manufacturing tolerances, and to reduce the amount of vibration occurring therein due to the pulsing hydrazine spray after an initial use of the system. While this technique allows reuse of the gas generator without the necessity to completely rebuild the generator after each use, the number of uses the generator is capable of without requiring rebuilding and replacement of the catalyst is still far less than satisfactory. The initial degradation of the primary catalyst bed is somewhat slower when springs are used to bias the secondary bed against the primary bed, but after initial wear in the primary catalyst bed occurs the catalyst degrades at a quickly increasing rate.

Another factor in the problem is the ambient temperature at which the gas generator is operating. While catalyst degradation is merely unsatisfactory at ambient temperatures of 70° F., at lower operating temperatures the catalyst breakdown rate drastically increases to make the expected life time of the gas generator particularly short, rendering the device no longer just unsatisfactory but rather unacceptable. While the number of multiple starts possible at a low ambient operating temperature is a maximum of 5-10, it must be noted that the performance of the gas generator as an engine start device sharply diminishes resulting in a markedly slower turbine acceleration, increasing start time, and drastic catalyst weight loss through increasing oscillatory vibration.

Since one of the most important applications of the gas generator is as an emergency power source for a military aircraft, which typically operates at a high altitudes having a low ambient temperature, it can be seen that this type of gas generator will have a fairly short operating life after which a complete rebuilding and replacement of the catalyst bed is necessary. Since the gas generator has application as a component in the emergency power system for the aircraft, any failure in the gas generator could result in loss of the aircraft due to failure to restart the engine or operate the electric or hydraulic system of the plane. It can therefore be appreciated that the gas generator would be required to be rebuilt after virtually every use to insure that loss of the aircraft does not result from decreased performance of the gas generator due to catalyst degradation from oscillatory vibration.

Although failure of the gas generator resulting in possible loss of an aircraft is of paramount importance, another major concern in premature catalyst degradation is the high cost of rebuilding the gas generator and replacing the catalyst. To rebuild the gas generator, it is necessary to remove the generator from the aircraft and completely disassemble it to replace the catalyst. Such an operation is labor intensive, requiring a substantial amount of time from a skilled technician. In addition, the Shell 405 or like catalyst used in the gas generator is extremely expensive. Although only a small amount of catalyst is contained in the primary and secondary beds of the gas generator, the cost of even the small amount of catalyst may be greater than the cost of the mechanically complete generator. Finally, an additional cost in military applications is that the aircraft must either have a large number of spare gas generators on hand, or else be unavailable for service while the gas generator is being rebuilt.

Thus, it can be seen that a strong need exists for a gas generator having an extended catalyst life allowing the generator to be reused a large number of times while requiring only minimal maintenance between uses. The gas generator must protect the catalyst particles from destructive oscillatory vibration to insure against loss of the catalyst in the primary bed and clogging of the catalyst in the secondary bed. The gas generator must be capable of functioning reliably at low temperatures, and of providing multiple starts at these low temperatures. Finally, it is desirable that whatever solution is found be adaptable to retrofit existing gas generators to overcome the above-described problems.

SUMMARY OF THE INVENTION

Accordingly, it is an object of the present invention to provide an emergency power unit, gas generator apparatus and method which inhibits vibration of the catalyst bed.

Another object is to provide such apparatus and method which inhibits such vibration without impairing the action of biasing means in urging the bed to move in one direction.

Another object is to provide such apparatus and method which may be readily retrofitted into existing emergency power unit designs.

In one arrangement the present invention prevents destructive oscillatory vibration by allowing only one-way movement of the secondary catalyst bed toward the primary catalyst bed, thereby allowing for compaction and degradation of the catalyst while effectively preventing virtually all of the oscillatory vibration previously resulting in destruction of the catalyst. The oneway travel of the secondary bed toward the primary bed thus prebiases the catalyst beds and allows the springs also used to bias the secondary bed against the primary bed to be effective in minimizing wear in the catalyst beds during operation of the gas generator.

The hardware used to prevent movement of the secondary catalyst bed away from the primary bed includes a load nut threadably secured to the housing and bearing against the secondary catalyst bed to prevent the secondary catalyst bed from moving away from the primary catalyst bed. A jam nut is threadably secured to the housing and advanced into firm engagement with the load nut to prevent both nuts from retreating on the threads of the housing. The nuts are designed to be adjusted to compensate between uses for compaction or bed degradation in the primary catalyst bed, the adjustment being made by advancing or retracting the nuts individually relative to one another by use of separate torque tubes or tools readily inserted inside the gas generator after each use thereof.

The nuts may be adjusted quickly and conveniently without disassembling the gas generator. After each use of a gas generator, it is necessary to replace a shear pin sealing the interior of the gas generator from contamination, and the nuts may be adjusted in a matter of seconds at the time the shear pin is replaced.

It can therefore be seen that the invention allows only one-way movement of the secondary catalyst bed adjacent the primary catalyst bed, and thus substantially reduces destructive oscillatory vibration in the gas generator during operation. In fact, when the present invention is utilized in the gas generator, it has been found that the number of uses before it is necessary to replace the catalyst is dramatically increased. At an ambient temperature of 70° F., the operating life of the gas generator before catalyst replacement is extended by a factor of 10.

In low ambient temperature operation, particularly important in military aircraft applications, the number of starts possible is increased from a maximum of 5-10 to approximately 300, at least a 30-fold increase in the number of uses provided before catalyst replacement is necessary. It should be noted that the substantially increased number of uses are provided without any loss of generator efficiency due to oscillatory vibration.

The arrangement described herein has also been designed so that it may be retrofit onto existing gas generators, requiring only a relatively minor remachining of the gas generator housing and supplying two additional parts. With the high cost of replacing the catalyst, the retrofitting operation pays for itself rather quickly given the increase by at least a factor of 10 in the number of multiple starts possible due to the present invention.

It can therefore be seen that the present invention provides an advantageous way of extending the useful life of a gas generator substantially before requiring rebuilding and catalyst replacement, without significant disadvantage. The minimal cost of the device is outweighed by the savings in terms of extended catalyst life, reduced rebuilding labor requirements, and aircraft downtime due to gas generator replacement. Adjustment of the assembly requires only a few seconds, and may be done during routine aircraft maintenance to replace the shear pin in the gas generator, a standard operation performed with existing gas generators. The present invention thus provides a gas generator having a substantially extended life, assures dependable operation of the gas generator in an emergency, and provides for substantial cost savings.

DESCRIPTION OF THE DRAWINGS

These and other advantages of the present invention are best understood through reference to the drawings, in which:

FIG. 1 is a partially schematic, partially cross-section elevational view of an emergency power unit embodying the present invention;

FIG. 2 is a perspective view of the load nut;

FIG. 3 is a perspective view of the jam nut;

FIG. 4 is a perspective view of the support plate against which the load nut bears; and FIG. 5 is an enlarged fragmentary view of a portion of FIG. 1 and showing the adjustment operation.

DETAILED DESCRIPTION OF THE PREFERRED EMBODIMENT

An emergency power unit 10 incorporating the present invention is shown in FIG. 1 and includes a source 12 of pressurized liquid hydrazine and a control 14 (which may be response to electrical command inputs) for producing a pulsed, pressurized liquid flow delivered to a gas generator 16. The gas generator 16 includes left and right housing halves 18 and 20, respectively, which are sealed by a metal O-ring 22 and held together by a number of bolts 24 and nuts 26 around the perimeters of the housing halves 18, 20.

Liquid hydrazine is supplied to the gas generator 16 through a hydrazine supply path 17, which is connected to the left housing half 18, which also includes a cover plate 28 to reduce the radiated heat from the housing 18. The liquid hydrazine is introduced into the gas generator 16 through an injector assembly 30, shown in FIGS. 1 and 2. The injector assembly 30 includes an injector housing 32 from which a number of spray arms 34 extend. In each of the spray arms 34 a number of nozzle apertures 36 are drilled, and it is through these nozzle apertures 36 that the liquid hydrazine is sprayed into the interior of the gas generator 16.

The location and configurations of the catalyst beds are illustrated as a primary catalyst bed 40 and a secondary catalyst bed 42. The catalyst used is preferably Shell 405 catalyst, which are 14-18 mesh granules. The primary catalyst bed is adjacent the injector assembly 30 at the left end of the gas generator 16 as illustrated in FIG. 1, and the catalyst granules of the primary catalyst bed 40 are contained in a primary catalyst canister 44 located in the left housing half 18.

The secondary catalyst bed 42, as mentioned before, is contained in a porous cylindrical canister which acts to confine the secondary catalyst bed 42. The secondary catalyst bed 42 is confined within a catalyst cylinder 50, and the catalyst is restrained within a catalyst cylinder 50 by two cover plates 52, 54 located at the two ends of the catalyst cylinder 50. The cover plates 52, 54 are identical, and are perforated with a number of apertures therethrough.

The catalyst granules in the secondary catalyst bed 42 are kept inside the cover plates 52, 54 by two screens 56, 58, which are located within the catalyst cylinder 50 on the inside of the cover plates 52, 54, respectively. The screen 56 prevents catalyst particle migration from the primary catalyst bed 40 into the secondary catalyst bed 42, and vice versa. The screen 58 prevents catalyst particle migration from the secondary catalyst bed 42 out of the gas generator 16.

While the catalyst cylinder 50 supports the cover plates 52, 54 at their outer perimeters, a cylindrical cover support ring 59 is used between the cover plates 52, 54 to support the cover plates 52, 54 at a location nearer the center. The cover support ring 59 has a number of apertures therein to allow for gas flow within the gas generator 16.

The gas generator 16 uses a number of springs 60 to bias the secondary catalyst bed 42 and its enclosure against the primary catalyst bed 40. In the preferred embodiment illustrated herein, three springs 60 are used, although only one spring 60 is shown in FIG. 1. The springs 60 bear against the interior of the housing 20, and exert a bias on the secondary catalyst bed 42 through spring guides 62 extending within the springs 60, which in turn bear on a support plate 64 adjacent the cover plate 54 which comprises a portion of the apparatus enclosing the secondary catalyst bed 42. To center cover support ring 59, a number of pins 66 through the cover plate 54 and the support plate 64 are used.

The secondary catalyst bed 42 and its enclosure, the support plate 64, and the spring guides 62 are held together in a unit assembled prior to installation in the housing 20 of the gas generator 16. A number of tie bolts 70 threaded into the spring guides 62 and through the support plate 64 and the cover plate 54 are threaded into spacers 72 within the secondary catalyst bed 42. Screws 74 are then inserted through the cover plate 42 and into the spacers 72 to complete the assembly, which may be then placed into the housing 20.

A poppet 80 is slidably mounted in the housing 20, the end of the poppet 80 extending into a guide assembly 82 screwed into the housing 20. The poppet 80 also includes an O-ring 86 to seal the interior of the gas generator 16 from contamination, and a shear pin 88 to hold the poppet 80 in the position shown in FIG. 1 when the gas generator 16 is not in use.

When the gas generator 16 is started, gas generated within the gas generator 16 will push the poppet 80 rightwardly into the guide assembly 82, shearing the shear pin 88, which is typically nylon or some other soft material. The poppet valve will thus move to an open position allowing gas to exit the gas generator 16 through the gas exit aperture 90.

The basic components of the present invention which prevents destructive oscillatory vibration within the gas generator 16 are a load nut 76 and jam nut 78 shown both in FIG. 1 and in perspective in FIGS. 2 and 3. The load nut 76 is carried on the threaded internal bore 21 of a central boss on housing 20 in FIG. 1, with an end surface 77 bearing tightly against the support plate 64 and the secondary catalyst bed 42 to prevent destructive oscillatory vibration of the catalyst in the primary catalyst bed 40. To prevent rightward travel of load nut 76 on the threads of the housing, the jam nut 78 is advanced leftwardly into firm, locking engagement with load nut 76 such that the frictional force between the contacting surfaces of the nuts prevents both nuts from rightward travel.

Load nut 76 includes a hexagonal central aperture 77 on the leftward portion 91 thereof which is spaced from a threaded segment 92 by a plurality of axial legs 93 between which are presented openings 94 through which flows the exhausting motive gas flow. Likewise, jam nut 78 includes a large central aperture 95 of multisided, polygonal configuration through which the exhausting motive gas flows. As clearly shown in FIG. 4, support plate 64 has a central circular portion 65 upon with portion 91 of load nut 76 bears, and a plurality of apertures 67 for carrying the exhaust flow.

Load nut 76, as shown in FIG. 4, has its threaded segment 92 scalloped to present dish-like depressions 92a. Similarly, the outer threaded periphery of jam nut 78 includes dish-like depressions 78a. Scalloped depressions 78a and 92a have been found to further increase gas generator life inasmuch as any fine dust of catalyst material which is created and becomes deposited on the threaded portions of the nuts will have escape openings so that the motive gas flow will tend to reduce entrainment of the dust on the threads. This reduces tendency of galling of the threads and permits a greater number of adjustments thereof to improve the overall life of the gas generator.

Assembly and ajustment operations of the load and jam nuts are illustrated in FIG. 5. With removal of guide assembly 82 and poppet 80, a pair of concentric polygonal, torque tubes or wrenches 96 and 98 may be inserted inside housing 20. Wrenches 96, 98 respectively have outer surfaces for engaging hexagonal aperture 77 and polygonal aperture 95, and outer tool 98 has a central through bore 97 for slidably receiving inner tool 96.

Upon assembly, outer wrench 98 is held against rotation while inner wrench 96 is rotated to advance portion 91 of load nut 76 leftwardly into the desired loaded engagement with support cover 64. Then, wrench 96 is held against rotation while outer wrench 98 is rotated to advance jam nut 78 leftwardly against the load nut. Tools 96, 98 are extracted, and poppet 80 and guide assembly 82 mounted upon housing 20 to complete assemblage.

Adjustment of the load nut and jam nut occurs after an operation of the emergency power unit. More particularly, the unit 10 is energized by appropriate command signal to control 12 to deliver the pulsed, pressurized liquid hydrazine flow to the catalyst beds 40, 42 for reaction therein to generate the motive discharge gas flow. As noted, this axial flow tends to induce axial vibration of the catalyst. However, the load nut and jam nut effectively preclude movement of the catalyst and their containers in a rightward direction, thus inhibiting vibration of the bed.

After the gas generator 16 has been operated, when the aircraft has returned to the ground for maintenance the shear pin 88 is normally replaced by removing the guide assembly 82 and the poppet 80. At this time, the wrenches 96, 98 may be inserted into the apertures 77 and 95 so that the load nut 76 may be tightened against the support plate 64, thus compensating for catalyst bed compaction and degradation in the primary bed. Jam nut 78 is then tightened against the load nut to lock the latter in place as described previously.

Design of the invention has made it possible for a retrofit operation on existing gas generators. By machining threads into the boss on housing 20, and inserting the load and jam nuts 76, 78, the invention is readily incorporated without even modification of poppet 80.

The invention achieves substantial advantage over preexisting gas generators at a remarkably low cost. It has been found that the catalyst in the gas generator will last fully ten times longer with the present invention installed in an ambient operating temperature of 70° F., and approximately 16 times longer at a ambient temperature of −40° F., the latter condition being encountered by military aircraft flying at relatively high altitudes. The cost savings achieved by the present invention are therefore substantial, since the catalyst used is very expensive.

In addition, since only a few seconds are necessary to tighten the load and jam nuts after the gas generator 16 is used, and since this may be done at the same time the shear pin 88 is replaced, which is standard operating procedure with gas generators not using the present invention, a substantial amount of labor and time may be saved since the gas generator 16 of the present invention does not have to be rebuilt or have the catalyst replaced nearly as often as pre-existing gas generators. In addition, military aircraft will have less downtime due to work required to be performed on the gas generator.

Since the extra cost accompanying the present invention is more than compensated for by a single replacement of catalyst in the gas generator, it can be seen that the present invention achieves an advantageous cost reduction over preexisting gas generators. This fact, when combined with the extended life time and assured dependable performance characteristics of the gas generator including the present invention make the present invention a substantial improvement over preexisting gas generators.

What is claimed is:

1. A gas generator comprising:
   a housing having an inlet adapted to receive pressurized liquid fluid flow and an outlet for discharging a motive gas flow;
   a porous bed of granular catalyst material disposed within said housing for reacting with the liquid fluid flow to generate the motive gas flow;
   wall means in said housing for containing said bed within a confined space;
   spring means operably engaging said wall means for exerting a biasing force in one direction tending to compact said bed of granular material; and
   locking means operably engaging said wall means for preventing movement of said bed in a second direction opposite said first direction.

2. A gas generator as set forth in claim 1, wherein said locking means are adjustable.

3. In a gas generator having a porous bed of granular catalyst material adapted to react with a pulsed, pressured, liquid flow to generate a higher energy motive gas exhaust flow, said pulsed liquid flow tending to induce vibration of said porous bed: porous wall means for holding said porous bed within a confined space; locking means operably engaging said wall means for inhibiting said vibration of the porous bed; and spring means for exerting a force tending to compact said granular material of the porous bed, said locking means operable to prevent movement of said bed in a direction opposing said force.

4. In an emergency power unit having a pulsed, pressurized fluid feed flow, a gas generator for producing a motive gas discharge flow, comprising:
   a housing having an internal cavity bounded by axially spaced, transverse walls, an inlet for receiving said feed flow, and an outlet for said gas discharge flow, said inlet and outlet opening into said cavity;
   a porous bed of granular catalyst material disposed in said cavity and operable to chemically react with said feed flow passing axially therethrough to generate said gas discharge flow;
   transverse, rigid, container walls for containing said granular catalyst material;
   a plurality of biasing springs operably extending between one of said walls of the housing and one of said container walls for exerting a biasing force tending to compact said granular material and for urging the other of said container walls axially into operably supporting contact with the other of said walls of the housing; and
   rigid, adjustable means extending between said housing and said one container wall for preventing axial movement of said bed toward said one wall of the housing without impairing the action of said biasing force of the springs in urging said bed to move axially toward said other wall of the housing.

5. A method of generating a controlled, emergency flow of motive gas, comprising:

delivering a pressurized, liquid feed flow;

reacting said feed flow with a confined bed of granular catalyst material to generate said emergency flow of motive gas, said variable pulse of the feed flow tending to induce vibration of said bed of granular material;

spring loading a container holding the bed in a confined space in one direction toward a fixed support, the spring loading tending to enhance vibration of said bed; and inhibiting vibration of said bed induced by said variable pulse by securing said container against motion in a direction opposing said one direction without impairing said spring loading in said one direction.

6. An emergency power unit for generating emergency motive gas flow, comprising:

a source of pressurized liquid;

a gas generator comprising a housing having an inlet for receiving said liquid, an outlet for discharging the motive gas flow, and an axially extending cavity bounded by a transverse wall, said inlet opening through said transverse wall into said cavity;

control means disposed between said source and said inlet for producing a controlled, variable pulse flow of said liquid to said inlet;

a porous bed of granular catalyst material in said housing, said pulse flow of liquid passing axially into said porous bed for reaction therewith to generate said motive gas flow, said pulse flow tending to induce axial vibration of said porous bed;

means operably engaging said porous bed for preventing axial movement thereof to inhibit said vibration;

container means for holding said bed within a confined space of preselected axial width in said cavity;

a plurality of springs for exerting an axial force on said bed tending to compact said granular material of the bed, said springs extending between said housing and said container means for urging the latter into operably supported engagement with said transverse wall, said means operably engaging said bed preventing axial movement thereof only in a direction opposing said axial force;

an axially movable poppet valve disposed between said bed and said outlet for closing fluid communication therebetween, said valve movable in response to the pressure of said motive gas flow to shift to an open position permitting fluid flow from said bed to said outlet;

said container means including a transverse plate operably engaging one end of said bed, a porous filter plate covering an opposite end of said bed, and an apertured support cover contacting said filter plate, said springs and said means operably engaging being disposed in said cavity and extending from said housing into engagement with said support cover, and said housing including a centrally disposed, internally threaded boss and a central bore within said boss extending from said cavity to said outlet, said means operably engaging including a load nut adjustably threaded to said boss and in engagement with said support cover, said load nut being apertured to permit gas flow therethrough.

7. An emergency power unit as set forth in claim 6, wherein said means operably engaging includes an apertured jam nut threaded to said boss and disposed completely therewithin, said jam nut being advanceable into firm engagement with said load nut to lock both said nuts against travel within said boss.

8. An emergency power unit as set forth in claim 7, wherein said load nut has an externally threaded portion in engagement with said boss, a plurality of axial legs extending toward said support cover, and a transverse plate section integrally joined with said legs and in engagement with said cover support.

9. An emergency power unit as set forth in claim 8, wherein said load nut and jam nut have internal surfaces of different diameter adapted to cooperate with different assembly tools whereby said load nut and jam nut may be separately advanced or retracted on said threaded boss by holding one tool stationary while rotating the other tool.

10. An emergency power unit as set forth in claim 9, further including a plug on said housing removable therefrom to permit insertion of said assembly tools through said central bore to said load nut and jam nut.

11. An emergency power unit for generating emergency motive gas flow, comprising:

a source of pressurized liquid;

a gas generator comprising a housing having an inlet for receiving said liquid, an outlet for discharging the motive gas flow, and a centrally disposed, internally threaded boss and a central bore within said boss extending to said outlet;

control means disposed between said source and said inlet for producing a controlled, variable pulse flow of said liquid to said inlet;

a porous bed of granular catalyst material in said housing, said pulse flow of liquid passing axially into said porous bed for reaction therewith to generate said motive gas flow, said pulse flow tending to induce axial vibration of said porous bed;

container means for holding said bed within a confined space of preselected axial width;

spring means for exerting an axial force on said bed tending to compact said granular material of the bed; and a load nut adjustably threaded to said boss and in engagement with said container means to prevent axial movement of said bed only in a direction opposing said axial force, said load nut being apertured to permit gas flow therethrough.

12. An emergency power unit as set forth in claim 11, further including an apertured jam nut threaded to said boss and disposed completely therewithin, said jam nut being advanceable into firm engagement with said load nut to lock both said nuts against travel within said boss.

13. An emergency power unit as set forth in claim 12, wherein said load nut has an externally threaded portion in engagement with said boss, a plurality of axial legs extending toward said container means, and a transverse plate section integrally joined with said legs and in engagement with said container means.

14. An emergency power unit as set forth in claim 13, wherein said load nut and jam nut have internal surfaces of different diameter adapted to cooperate with different assembly tools whereby said load nut and jam nut may be separately advanced or retracted on said threaded boss by holding one tool stationary while rotating the other tool.

15. An emergency power unit as set forth in claim 14, further including a plug on said housing removable thereform to permit insertion of said assembly tools through said central bore to said load nut and jam nut.

16. An emergency power unit as set forth in claim 11, further including an axially movably poppet valve disposed between said bed and said outlet for closing fluid communication therebetween, said valve movable in response to the pressure of said motive gas flow to shift to an open position permitting fluid flow from said bed to said outlet.

17. An emergency power unit as set forth in claim 11, wherein said container means includes a transverse plate operably engaging one end of said bed, a porous filter plate covering an opposite end of said bed, and an apertured support cover contacting said filter plate, said springs and said load nut extending from said housing into engagement with said support cover.

* * * * *

UNITED STATES PATENT AND TRADEMARK OFFICE
CERTIFICATE OF CORRECTION

PATENT NO. : 4,505,105
DATED : March 19, 1985
INVENTOR(S) : Ronald J. Ness

It is certified that error appears in the above-identified patent and that said Letters Patent are hereby corrected as shown below:

Col. 10, line 10, "cover support" should read --support cover--

Signed and Sealed this

Third Day of September 1985

[SEAL]

Attest:

DONALD J. QUIGG

Attesting Officer  Acting Commissioner of Patents and Trademarks - Designate